United States Patent
Feng et al.

(10) Patent No.: US 9,377,948 B2
(45) Date of Patent: Jun. 28, 2016

(54) SPECIAL INPUT FOR GENERAL CHARACTER INQUIRIES FOR INPUT TO INFORMATION HANDLING DEVICE

(71) Applicant: Lenovo (Singapore) Pte. Ltd., Singapore (SG)

(72) Inventors: Xin Feng, Arcadia, CA (US); Mei-Wen Sun, Raleigh, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 331 days.

(21) Appl. No.: 13/932,750

(22) Filed: Jul. 1, 2013

(65) Prior Publication Data

US 2015/0003735 A1    Jan. 1, 2015

(51) Int. Cl.
G06F 3/0488 (2013.01)
G06F 3/0489 (2013.01)
G06F 3/023 (2006.01)

(52) U.S. Cl.
CPC .......... *G06F 3/04883* (2013.01); *G06F 3/0237* (2013.01); *G06F 3/04895* (2013.01)

(58) Field of Classification Search
CPC .................................................. G06F 3/04833
USPC .................................................. 382/185–189
See application file for complete search history.

(56) References Cited

U.S. PATENT DOCUMENTS

| | | | | |
|---|---|---|---|---|
| 5,970,170 A * | 10/1999 | Kadashevich | ..... | G06K 9/00872 382/179 |
| 6,690,364 B1 * | 2/2004 | Webb | ................. | G06F 3/04883 345/173 |
| 7,149,970 B1 * | 12/2006 | Pratley | ................. | G06F 17/273 704/10 |
| 7,848,573 B2 * | 12/2010 | Wecker | ............... | G06F 3/04883 382/186 |
| 8,423,908 B2 * | 4/2013 | Fux | ........................ | G06F 17/275 704/8 |
| 8,677,236 B2 * | 3/2014 | Bower | ................... | G06F 3/0237 704/240 |
| 2004/0057619 A1 * | 3/2004 | Lim et al. | ...................... | 382/182 |
| 2004/0148577 A1 * | 7/2004 | Xu | ...................... | G06F 3/04883 715/268 |
| 2005/0135678 A1 * | 6/2005 | Wecker | ............... | G06F 3/04883 382/186 |
| 2009/0157755 A1 * | 6/2009 | Yoshida | .............. | G06F 17/2735 |
| 2014/0056523 A1 * | 2/2014 | Na | ........................ | G06F 3/041 382/185 |

OTHER PUBLICATIONS

"Feature Phone Key 6", available prior to Jul. 1, 2013, 1 page.
"Result of Blank as Part Input", available prior to Jul. 1, 2013, 1 page.
"Result of Generic Key Input", available prior to Jul. 1, 2013, 1 page.

* cited by examiner

*Primary Examiner* — Ishrat I Sherali

(74) *Attorney, Agent, or Firm* — Ference & Associates LLC

(57) ABSTRACT

An aspect provides a method, including: accepting, at an input surface of an information handling device, one or more inputs, the one or more inputs comprising handwriting inputs including a special handwriting input pre-associated with a request for assistance; determining, using one or more processors, a candidate list of inputs based on the handwriting inputs and the special handwriting input; and providing a display of the candidate list. Other aspects are described and claimed.

20 Claims, 5 Drawing Sheets

SPECIAL INPUT FOR GENERAL CHARACTER INQUIRIES FOR INPUT TO INFORMATION HANDLING DEVICE

BACKGROUND

Information handling devices ("devices") come in a variety of forms, for example laptop computing devices, tablet computing devices, smart phones, e-readers, MP3 players, and the like. Many such devices are configured for use with a touch input surface as a mode of input. In this description, "touch" or "touch sensitive" (or like variations) are used to describe both physical contact sensing and proximity sensing, e.g., "hovering" at or near the surface detecting the input.

Certain form factors, e.g., tablets and smart phones, have the capability to use handwriting as input, e.g., in addition to accepting typed input. Various methods are used to provide handwriting input such as use of a pen or stylus or use of a finger tip. A common example of a currently available handwriting device includes a tablet equipped with a touch screen. An example of a current program or application that accepts handwriting is the GOOGLE HANDWRITE application.

BRIEF SUMMARY

In summary, one aspect provides a method, comprising: accepting, at an input surface of an information handling device, one or more inputs, the one or more inputs comprising handwriting inputs including a special handwriting input pre-associated with a request for assistance; determining, using one or more processors, a candidate list of inputs based on the handwriting inputs and the special handwriting input; and providing a display of the candidate list.

Another aspect provides an information handling device, comprising: a display; an input surface; one or more processors; a memory device storing instructions accessible to the one or more processors, the instructions being executable by the one or more processors to: accept, at the input surface, one or more inputs, the one or more inputs comprising handwriting inputs including a special handwriting input pre-associated with a request for assistance; determine, using the one or more processors, a candidate list of inputs based on the handwriting inputs and the special handwriting input; and provide, using the one or more processors, a display of the candidate list on the display.

A further aspect provides a computer program product, comprising: a storage medium having computer readable program code embodied therewith, the computer readable program code comprising: computer readable program code configured to accept, at an input surface of an information handling device, one or more inputs, the one or more inputs comprising handwriting inputs including a special handwriting input pre-associated with a request for assistance; computer readable program code configured to determine, using one or more processors, a candidate list of inputs based on the handwriting inputs and the special handwriting input; and computer readable program code configured to provide, using the one or more processors, a display of the candidate list.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

DETAILED DESCRIPTION

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, the appearance of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, et cetera. In other instances, well known structures, materials, or operations are not shown or described in detail to avoid obfuscation.

The illustrated example embodiments will be best understood by reference to the figures. The following description is intended only by way of example, and simply illustrates certain example embodiments.

Figure 1:
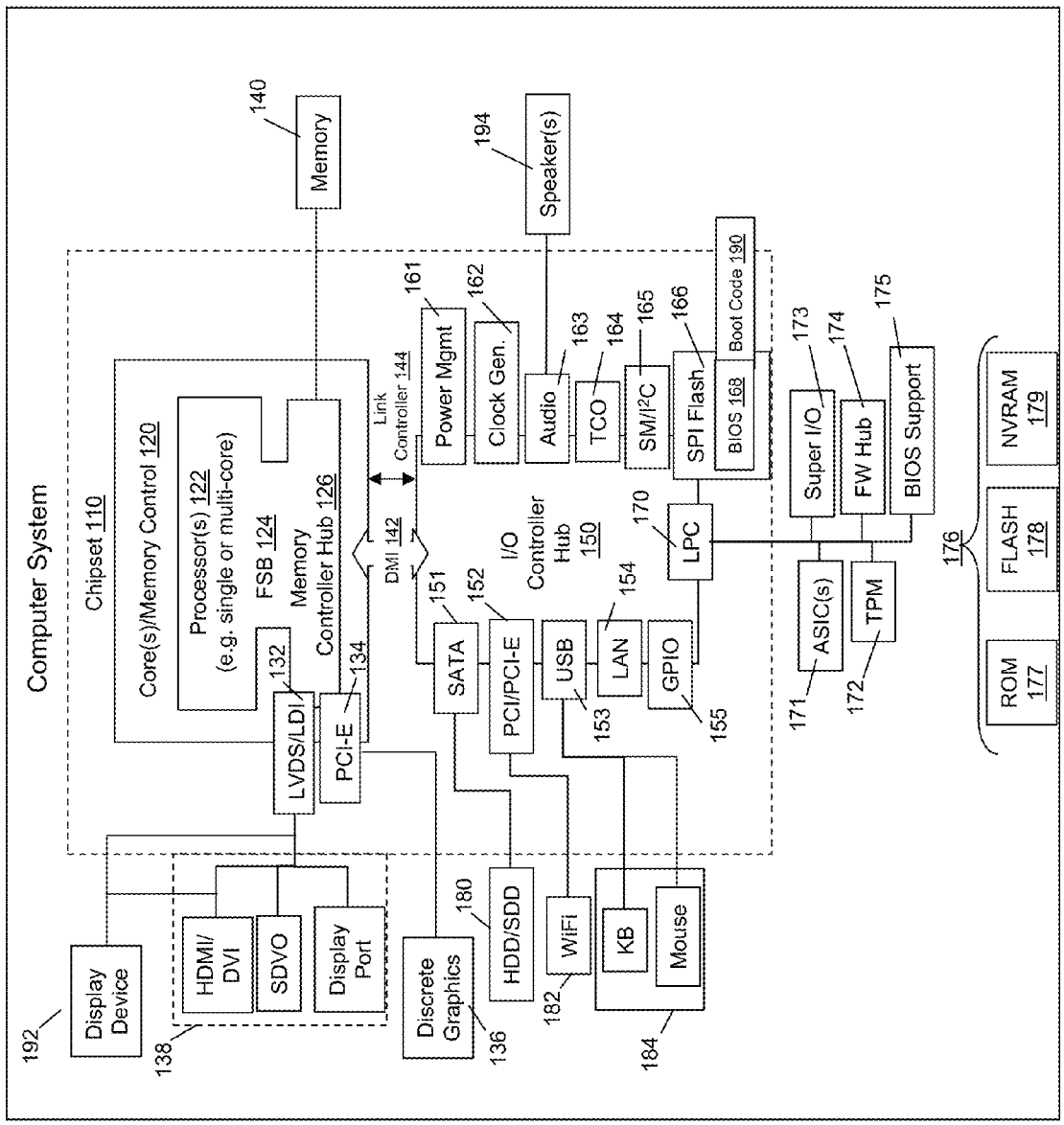
FIG. 1 illustrates an example of information handling device circuitry.
Figure 2:
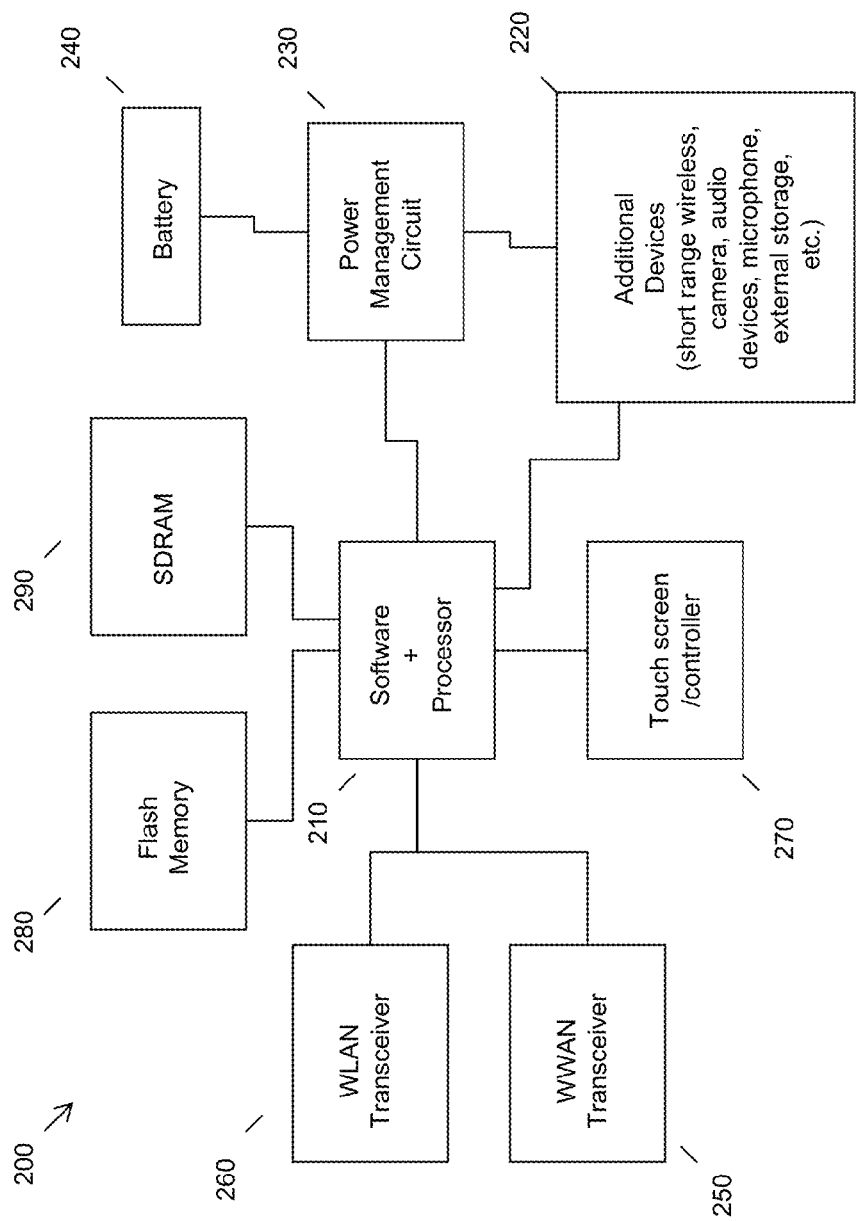
FIG. 2 illustrates another example of information handling device circuitry.

Referring to FIG. 1 and FIG. 2, while various other circuits, circuitry or components may be utilized in information handling devices, with regard to smart phone and/or tablet circuitry 200, an example illustrated in FIG. 2 includes an ARM based system (system on a chip) design, with software and processor(s) combined in a single chip 210. Internal busses and the like depend on different vendors, but essentially all the peripheral devices (220) may attach to a single chip 210. In contrast to the circuitry illustrated in FIG. 1, the tablet circuitry 200 combines the processor, memory control, and I/O controller hub all into a single chip 210. Also, ARM based systems 200 do not typically use SATA or PCI or LPC. Common interfaces for example include SDIO and I2C.

There are power management chip(s) 230, e.g., a battery management unit, BMU, which manage power as supplied for example via a rechargeable battery 240, which may be recharged by a connection to a power source (not shown). In at least one design, a single chip, such as 210, is used to supply BIOS like functionality and DRAM memory.

ARM based systems 200 typically include one or more of a WWAN transceiver 250 and a WLAN transceiver 260 for connecting to various networks, such as telecommunications networks and wireless base stations. Commonly, an ARM based system 200 will include a touch screen 270 for data input and display. ARM based systems 200 also typically include various memory devices, for example flash memory 280 and SDRAM 290.

FIG. 1, for its part, depicts a block diagram of another example of information handling device circuits, circuitry or components. The example depicted in FIG. 1 may correspond to computing systems such as the THINKPAD series of personal computers sold by Lenovo (US) Inc. of Morrisville, N.C., or other devices. As is apparent from the description herein, embodiments may include other features or only some of the features of the example illustrated in FIG. 1.

The example of FIG. 1 includes a so-called chipset 110 (a group of integrated circuits, or chips, that work together, chipsets) with an architecture that may vary depending on manufacturer (for example, INTEL, AMD, ARM, etc.). The architecture of the chipset 110 includes a core and memory control group 120 and an I/O controller hub 150 that exchanges information (for example, data, signals, commands, et cetera) via a direct management interface (DMI) 142 or a link controller 144. In FIG. 1, the DMI 142 is a chip-to-chip interface (sometimes referred to as being a link between a "northbridge" and a "southbridge"). The core and memory control group 120 include one or more processors 122 (for example, single or multi-core) and a memory controller hub 126 that exchange information via a front side bus (FSB) 124; noting that components of the group 120 may be integrated in a chip that supplants the conventional "northbridge" style architecture.

In FIG. 1, the memory controller hub 126 interfaces with memory 140 (for example, to provide support for a type of RAM that may be referred to as "system memory" or "memory"). The memory controller hub 126 further includes a LVDS interface 132 for a display device 192 (for example, a CRT, a flat panel, touch screen, et cetera). A block 138 includes some technologies that may be supported via the LVDS interface 132 (for example, serial digital video, HDMI/DVI, display port). The memory controller hub 126 also includes a PCI-express interface (PCI-E) 134 that may support discrete graphics 136.

In FIG. 1, the I/O hub controller 150 includes a SATA interface 151 (for example, for HDDs, SDDs, 180 et cetera), a PCI-E interface 152 (for example, for wireless connections 182), a USB interface 153 (for example, for devices 184 such as a digitizer, keyboard, mice, cameras, phones, microphones, storage, other connected devices, et cetera), a network interface 154 (for example, LAN), a GPIO interface 155, a LPC interface 170 (for ASICs 171, a TPM 172, a super I/O 173, a firmware hub 174, BIOS support 175 as well as various types of memory 176 such as ROM 177, Flash 178, and NVRAM 179), a power management interface 161, a clock generator interface 162, an audio interface 163 (for example, for speakers 194), a TCO interface 164, a system management bus interface 165, and SPI Flash 166, which can include BIOS 168 and boot code 190. The I/O hub controller 150 may include gigabit Ethernet support.

The system, upon power on, may be configured to execute boot code 190 for the BIOS 168, as stored within the SPI Flash 166, and thereafter processes data under the control of one or more operating systems and application software (for example, stored in system memory 140). An operating system may be stored in any of a variety of locations and accessed, for example, according to instructions of the BIOS 168. As described herein, a device may include fewer or more features than shown in the system of FIG. 1.

Information handling devices, as for example outlined in FIG. 1 and FIG. 2, may provide user interfaces that accept handwritten input. However, conventionally users must know the precise roman word (for letter-based languages) or character structure (for character-based languages) for handwriting input to be interpreted properly. If a user only knows part of a roman based word, e.g., "ster" or "stere" for "stereo" or a partial structure of a character, the user cannot get results or even relevant suggestions for what he or she is looking for.

Conventional handwriting applications will attempt to provide candidate lists based on the user's input. However, the candidate list is based on the similarity to the user's strokes or input characteristics rather than suggestions based on a user's partial input for either the roman word or character.

Figure 3:
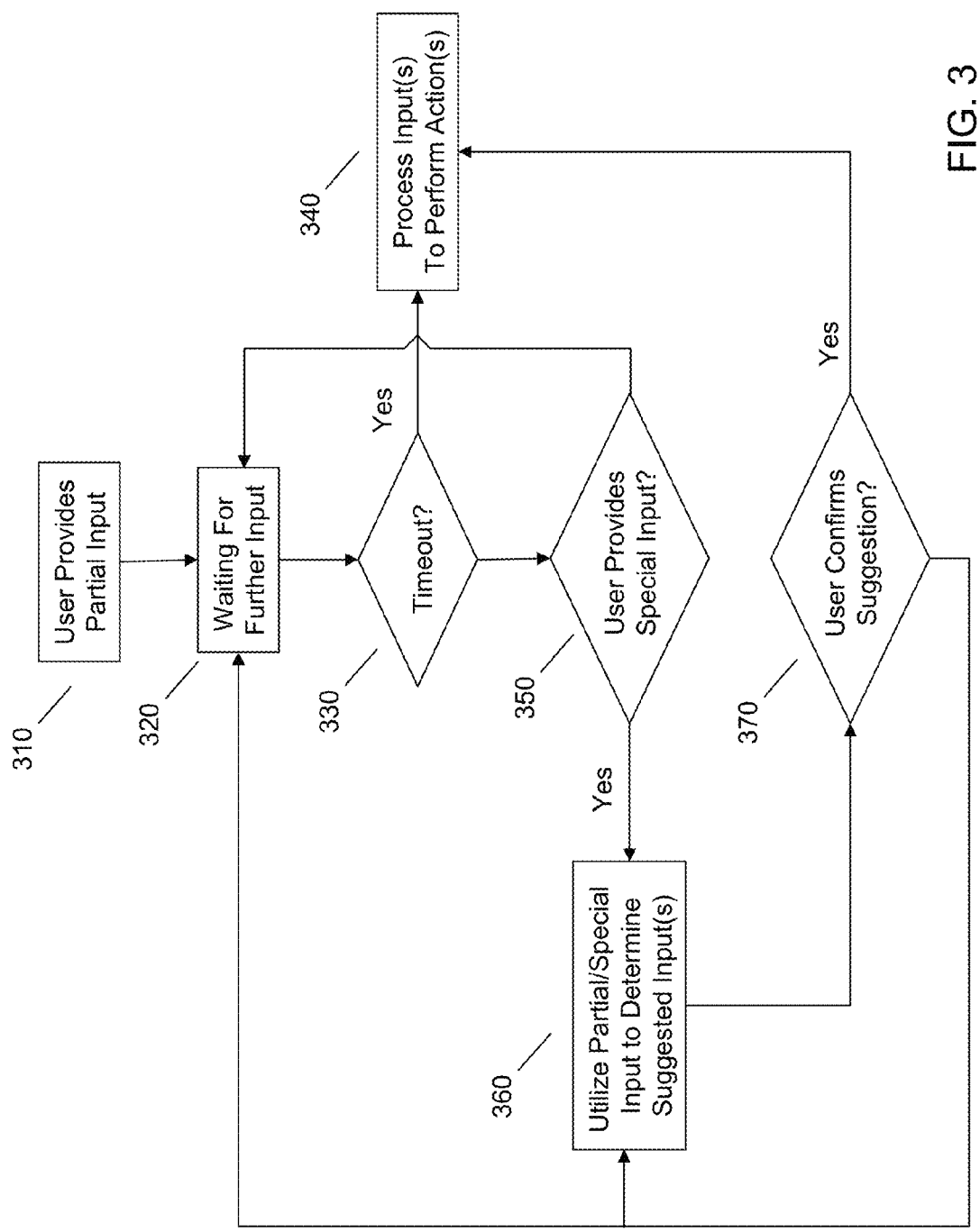
FIG. 3 illustrates an example method of determining special input and providing candidate suggestions.

Accordingly, an embodiment permits a user to input a special input (e.g., a special character or gesture) that indicates that the user is requesting assistance or suggestions for completing the partial input (e.g., partial word or character input). For example, referring to FIG. 3, in an embodiment, a user first provides a partial word or partial character input to a device interface at 310, e.g., to a touch screen surface using his or her finger. An embodiment may wait for further input at 320, e.g., input at 310 is understood as partial input such as the first few letters of a roman based word or the first few strokes of a character for a character-based language.

In an embodiment, a timeout may be implemented at 330, e.g., an embodiment may wait a predetermined time after receiving one or more inputs at 310 such that the user may continue forming the roman/letter based word or the character, or to provide further input, as described herein. If a timeout has been reached at 320 an embodiment may attempt to process the input thus far at 340. This may include for example accepting the input at 310 as complete input and processing a corresponding action (e.g., matching the input at 310 to a word and filling in that word in text input box, etc.).

A user may provide further inputs during the waiting period 320, e.g., prior to timeout at 330. For example, a user may input at 350 a special input such as a special character or gesture. If such a special input is provided by the user at 350, an embodiment may interpret this as a cue to assist the user in providing the inputs. Otherwise, an embodiment may continue waiting at 320 until the timeout at 330. It should be noted that in addition to or in lieu of a timeout at 330 (or other appropriate time), an embodiment may provide an additional input (e.g., finger tap, button press, etc.) to act as a positive indication that the user has completed an input session.

If the special input has been received at 350, an embodiment may attempt to utilize the partial input and the special input at 360 to determine suggestions for the user. For example, an embodiment may utilize the partial input in combination with the special input, as further described herein, to provide a listing of likely inputs that the user is intending. The suggestion(s) may be presented to the user at 370 for user confirmation, e.g., selection from a list. If the user confirms a suggestion at 370, e.g., via selection of a suggestion from a list of candidate suggestions, an embodiment may thereafter process the inputs to perform an action at 340 (which again may take a variety of forms, e.g., processing the handwritten input to a text input, automatically executing a further action on the basis of the interpreted handwritten input, etc.). Otherwise, an embodiment may make further suggestions 360 or wait for further input, e.g., a further special input such as another special character or the like.

In an embodiment, a special input may take the form of a special character that is used to generally signify that the user is asking for assistance in forming the handwritten input. Moreover, an embodiment may take into account a characteristic of the special input, e.g., its timing (such as its sequence of appearance in the handwritten input), its location (e.g., formed in place of an unknown roman letter or an unknown character sub-structure or stroke), etc.

Figure 4:
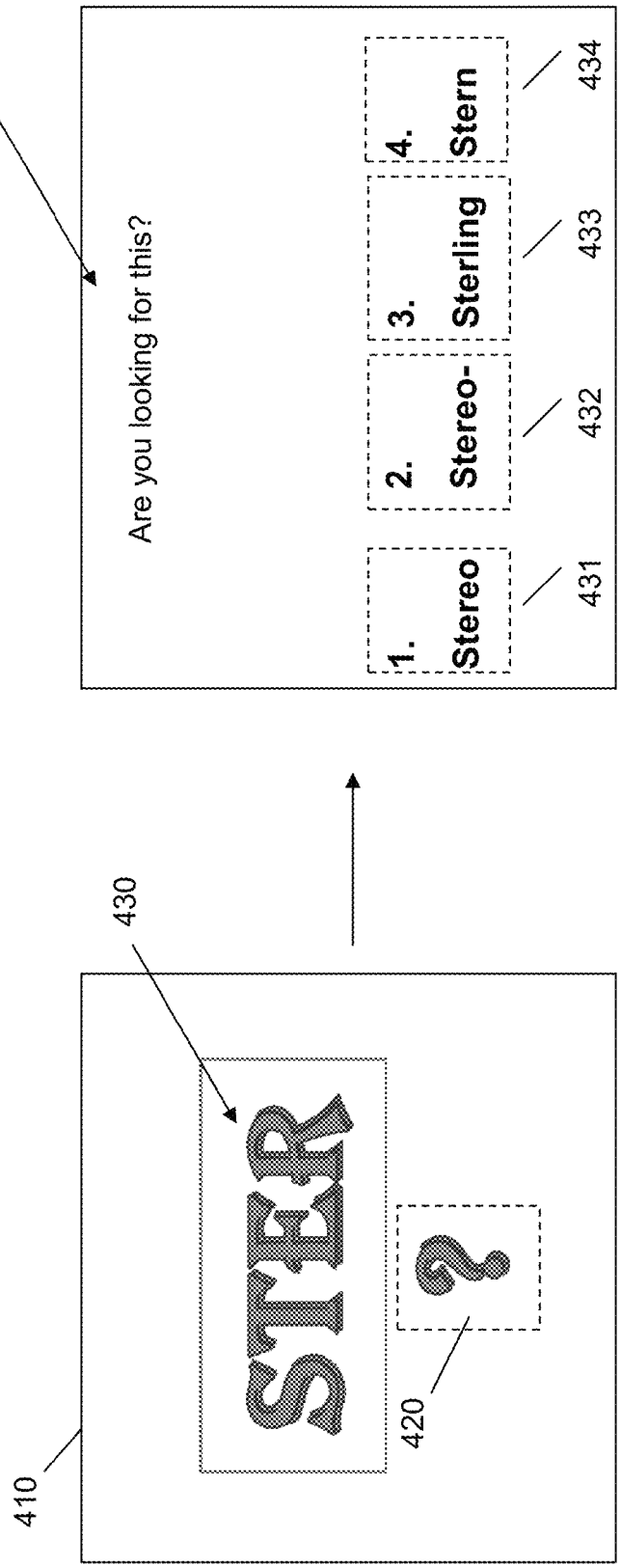
FIG. 4 illustrates an example special input and candidate suggestions.

For example, referring to FIG. 4, a user may open a handwriting panel 410 in a handwriting application (e.g., for web search or other application suitable for accepting handwritten input). The user will provide a special input, e.g., drawing a "?" 420 as generic replacement. For roman based languages (e.g., English, Spanish, French, etc.), a "?" 420 may be used as a generic replacement for one or more letters in the word 430 or may be placed elsewhere, e.g., below the known letters 430 as illustrated in FIG. 4. In a case where "?" 420 is used as a generic replacement of one letter, multiple "?" 420 can be used if there is a need to represent multiple generics letters. For such letter-based languages, "?" 420 may be used at different positions of a word 430 in the handwriting. Some examples include but are not limited to the following.

In the illustrated example of FIG. 4, if a user writes "STER" 430 in a handwriting panel 410 along with a special handwriting input 420 of "?", an embodiment will display a candidates list in a panel 440 including candidates 431 ("Stereo"), 432 ("Stereo-"), 433 ("Sterling"), 434 ("Stern") (these candidates are non-exhaustive examples). Thus, the user is may input a partial handwriting input 430 and a special input 420 and be provided with a candidate list of suggestions for selection and entry of an appropriate handwritten input. The completion of the handwriting may be performed by the system or the user may be provided with a new panel to enter the compete handwriting input following the candidate suggestion phase.

As an additional example, if a user writes "?an", an embodiment may display candidates in a list such as: "can", "pan", "tan", e.g., such that the special input is interpreted as a request for assistance in forming a word for which the user is unsure of the first letter. As another example, if a user writes "s?t", an embodiment may display candidates in a list such as: "sit", "sat", "set", e.g., such that the special input is interpreted as a request for assistance in forming a word for which the user is unsure of the letter or letter(s) in the place of the special character "?". Likewise, if a user writes "te?", an embodiment may display the candidates list: "tea", "tee", "ten". As described herein, for letter-based languages, "?" may be used multiple times in different positions of a word in the handwriting, corresponding to the case where a user is certain that more than one character is unknown.

In the case of character-based languages (e.g., Chinese, Japanese, etc.), a special input, e.g., "?", may be used as a generic replacement of one or more stroke(s) or sub-structure(s) in the character. For character-based languages, "?" also may be used at different positions of the character in the handwriting. Some non-limiting examples are as follows.

Figure 5:
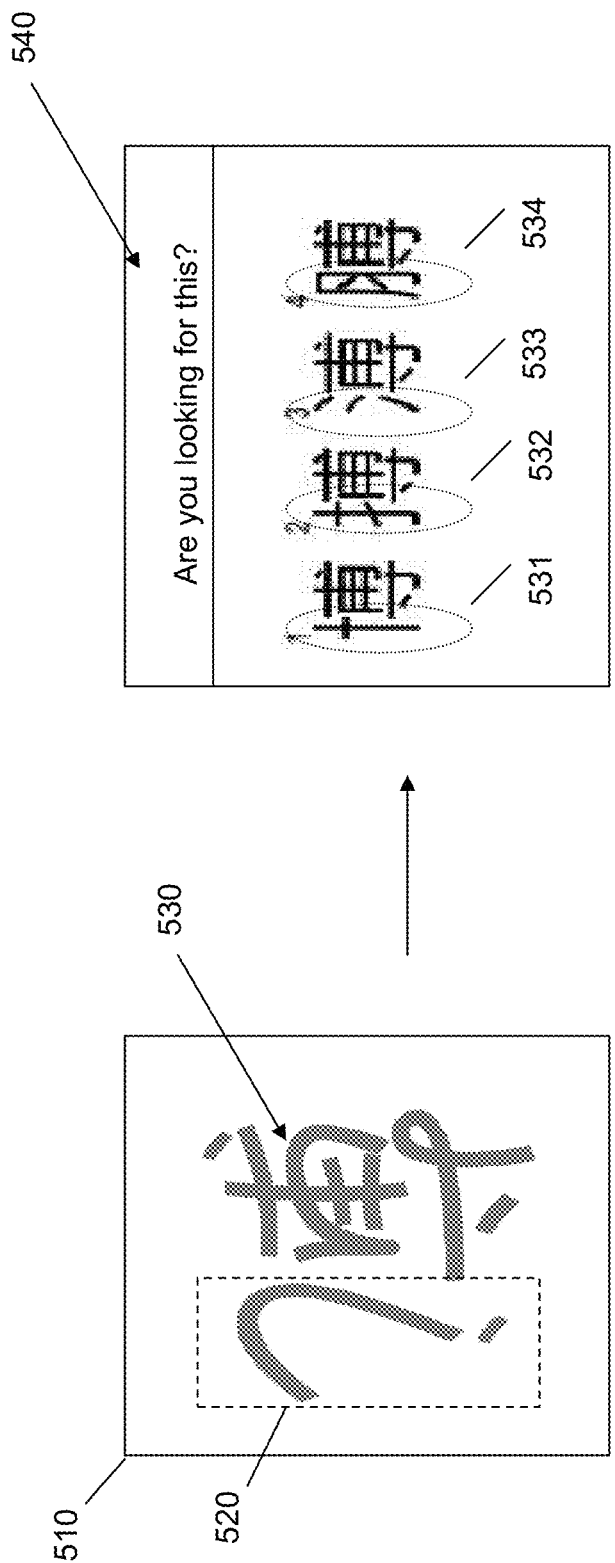
FIG. 5 illustrates an example special input and candidate suggestions.

In the character-based language example, referring to FIG. 5, if a user writes "?" 520 as a portion or sub-structure in a character 530 in a handwriting input panel 510, an embodiment may display a candidate list in which candidate characters including the base structure (e.g., without the "?" portion) are included with candidates having different strokes or sub-elements in place of the special input, e.g., "?". In the example of FIG. 5, four candidate characters 531, 532, 533, 544 are provided to the user in a suggestion panel 540 given the partial input character with the special input 520. The user may select from the candidate characters 531, 532, 533, 544 to form an input to be acted on, as described herein. As with letter based-languages, a user may provide more than one special input to replace an unknown stroke within a character or set of characters.

As described herein, an embodiment facilitates input using handwriting by providing user assistance in forming the proper input. This enables a user, e.g., unfamiliar with the proper spelling (in the case of a letter-based language) or unfamiliar with the proper strokes or sub-elements (in the case of a character-based language), to find assistance in forming the appropriate handwritten input. As will be appreciated, the use of a "?" as a special input is not limiting but is used merely as a representative of an appropriate special input that may be conveniently used when a user needs to signify that a letter or stroke is unknown and obtain assistance from a system. Another special input, including a gesture or other character(s) may be utilized alone or in combination with the examples given herein. Thus, an embodiment utilizes the special input(s) to ascertain a user is in need of assistance and to determine appropriate candidates for inclusion as suggestions.

It will be understood by those having ordinary skill in the art that any combination of one or more non-signal device readable medium(s) may be utilized in connection with various embodiments described herein. The non-signal medium may be a storage medium. A storage medium may be any non-signal medium, for example, an electronic, magnetic, optical, electromagnetic, infrared, or semiconductor system, apparatus, or device, or any suitable combination of the foregoing. More specific examples of a storage medium would include the following: a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Program code embodied on a storage medium may be transmitted using any appropriate medium, including but not limited to wireless, wireline, optical fiber cable, RF, et cetera, or any suitable combination of the foregoing.

Program code for carrying out operations may be written in any combination of one or more programming languages. The program code may execute entirely on a single device, partly on a single device, as a stand-alone software package, partly on single device and partly on another device, or entirely on the other device. In some cases, the devices may be connected through any type of connection or network, including a local area network (LAN) or a wide area network (WAN), a personal area network (PAN), or the connection may be made through other devices (for example, through the Internet using an Internet Service Provider) or through a hard wire connection, such as over a USB connection.

Aspects are described herein with reference to the figures, which illustrate example methods, devices and program products according to various example embodiments. It will be understood that the actions and functionality illustrated may be implemented at least in part by program instructions. These program instructions may be provided to a processor of a general purpose information handling device, a special purpose information handling device, or other programmable data processing device or information handling device to produce a machine, such that the instructions, which execute via a processor of the device implement the functions/acts specified.

The program instructions may also be stored in a device readable medium that can direct a device to function in a particular manner, such that the instructions stored in the device readable medium produce an article of manufacture including instructions which implement the function/act specified.

The program instructions may also be loaded onto a device to cause a series of operational steps to be performed on the device to produce a device implemented process such that the instructions which execute on the device provide processes for implementing the functions/acts specified.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Thus, although illustrative example embodiments have been described herein with reference to the accompanying figures, it is to be understood that this description is not limiting and that various other changes and modifications may be affected therein by one skilled in the art without departing from the scope or spirit of the disclosure.

What is claimed is:

1. A method, comprising:
    accepting, at an input surface of an information handling device, one or more inputs, the one or more inputs comprising handwriting inputs including a special handwriting input pre-associated with a request for assistance;
    determining, using one or more processors, a candidate list of inputs based on the handwriting inputs and the special handwriting input; and
    providing a display of the candidate list.

2. The method of claim 1, wherein the special handwriting input comprises a special character input.

3. The method of claim 2, further comprising determining, using the one or more processors, a position of the special handwriting input with respect to one or more other inputs in the handwriting inputs.

4. The method of claim 3, wherein the determining, using the one or more processors, a candidate list of inputs based on the handwriting inputs and the special handwriting input takes into account the position of the special input with respect to one or more other inputs in the handwriting inputs.

5. The method of claim 3, wherein the special character is formed in place of one or more letters in a letter-based word.

6. The method of claim 3, wherein the special character is formed in place of one or more strokes in a character of a character-based language.

7. The method of claim 1, further comprising, ascertaining, using the one or more processors, user input selecting one of the candidate list of inputs; and inputting, using the one or more processors, a candidate input selected in place of initial handwriting input.

8. The method of claim 7, further comprising performing, using the one or more processors, one or more actions after the candidate input selected is processed.

9. The method of claim 1, wherein the input surface comprises' a touch screen.

10. An information handling device, comprising:
    a display;
    an input surface;
    one or more processors;
    a memory device storing instructions accessible to the one or more processors, the instructions being executable by the one or more processors to:
    accept, at the input surface, one or more inputs, the one or more inputs comprising handwriting inputs including a special handwriting input pre-associated with a request for assistance;
    determine, using the one or more processors, a candidate list of inputs based on the handwriting inputs and the special handwriting input; and
    provide, using the one or more processors, a display of the candidate list on the display.

11. The information handling device of claim 10, wherein the special handwriting input comprises a special character input.

12. The information handling device of claim 11, wherein the instructions are further executable by the one or more processors to determine, using the one or more processors, a position of the special input with respect to one or more other inputs in the handwriting inputs.

13. The information handling device of claim 12, wherein to determine, using the one or more processors, a candidate list of inputs based on the handwriting inputs including the special input takes into account the position of the special input with respect to one or more other inputs in the handwriting inputs.

14. The information handling device of claim 12, wherein the special character is formed in place of one or more letters in a letter-based word.

15. The information handling device of claim 12, wherein the special character is formed in place of one or more strokes in a character of a character-based language.

16. The information handling device of claim 10, wherein the instructions are further executable by the one or more processors to ascertain, using the one or more processors, user input selecting one of the candidate list of inputs; and input, using the one or more processors, a candidate input selected in place of initial handwriting input.

17. The information handling device of claim 10, wherein the input surface is selected from the group consisting of a touch screen and a touch pad.

18. The information handling device of claim 10, wherein the display and the input surface form a touch screen.

19. The information handling device of claim 10, wherein the information handling device is one of a tablet computing device and a smart phone.

20. A computer program product, comprising:
    a computer readable storage medium having computer readable program code embodied therewith, the computer readable program code comprising:
    computer readable program code that accepts, at an input surface of an information handling device, one or more inputs, the one or more inputs comprising handwriting inputs including a special handwriting input pre-associated with a request for assistance;
    computer readable program code that determines, using one or more processors, a candidate list of inputs based on the handwriting inputs and the special handwriting input; and
    computer readable program code that provides, using the one or more processors, a display of the candidate list.

* * * * *